A. MILL.
TUBE ROLLING MACHINE.
APPLICATION FILED SEPT. 22, 1905.

923,553.

Patented June 1, 1909.
9 SHEETS—SHEET 1.

A. MILL.
TUBE ROLLING MACHINE.
APPLICATION FILED SEPT. 22, 1905.

923,553.

Patented June 1, 1909.
9 SHEETS—SHEET 2.

A. MILL.
TUBE ROLLING MACHINE.
APPLICATION FILED SEPT. 22, 1905.

923,553.

Patented June 1, 1909.
9 SHEETS—SHEET 4.

A. MILL.
TUBE ROLLING MACHINE.
APPLICATION FILED SEPT. 22, 1905.

923,553.

Patented June 1, 1909.
9 SHEETS—SHEET 5.

Witnesses:

Inventor:
Anton Mill
by Brown & ... Hopkins
Attys

A. MILL.
TUBE ROLLING MACHINE.
APPLICATION FILED SEPT. 22, 1905.

923,553.

Patented June 1, 1909.
9 SHEETS—SHEET 6.

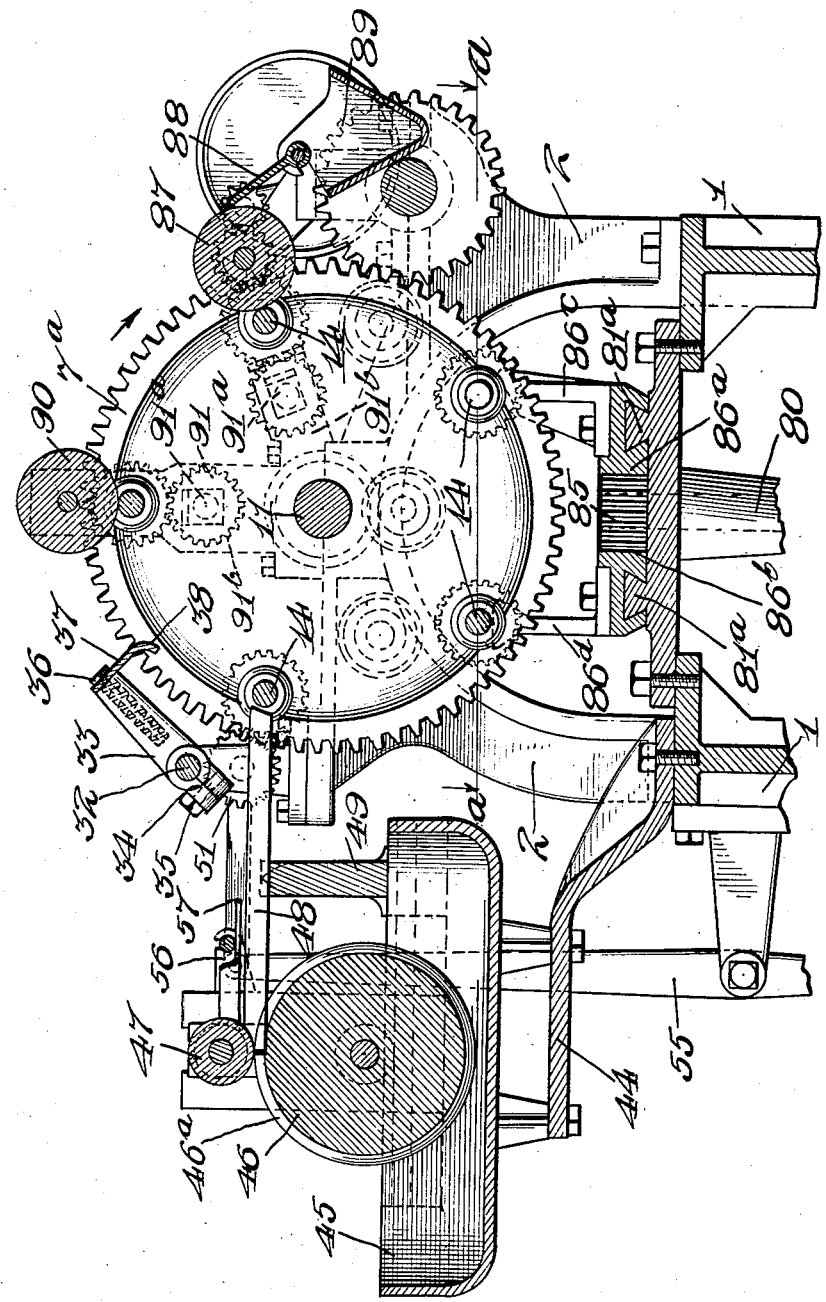

A. MILL.
TUBE ROLLING MACHINE.
APPLICATION FILED SEPT. 22, 1905.
923,553.
Patented June 1, 1909.
9 SHEETS—SHEET 8.
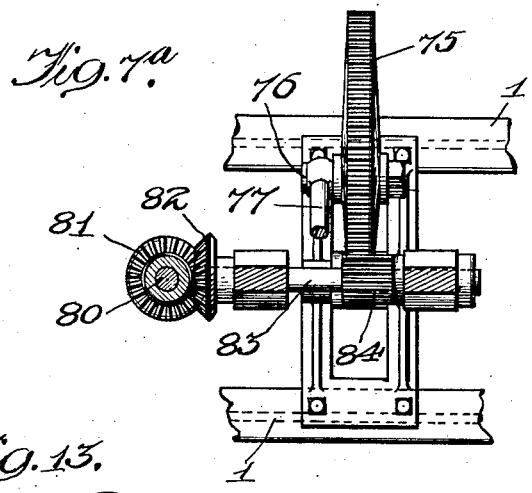
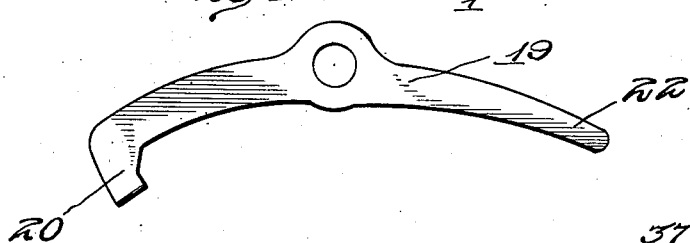
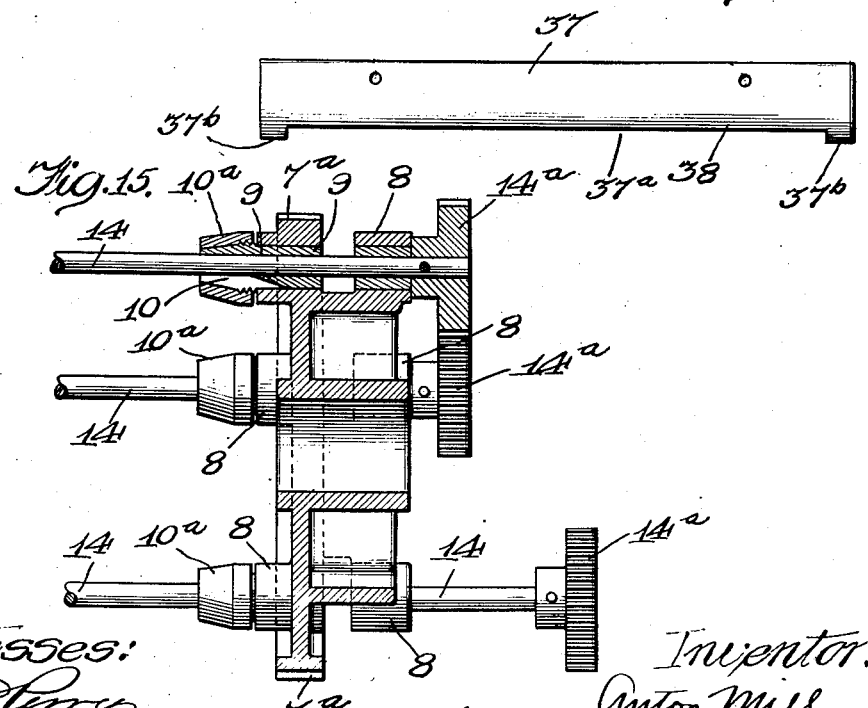
Witnesses:
Inventor:
Anton Mill

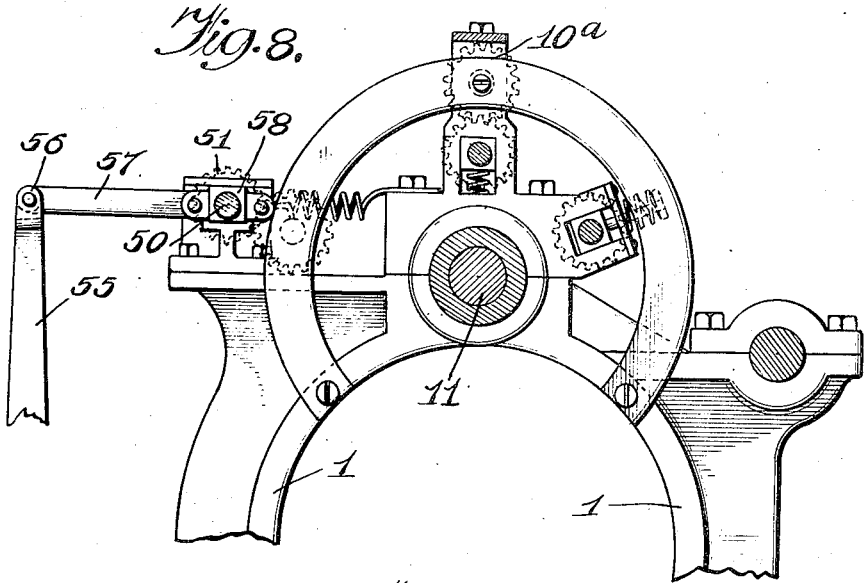
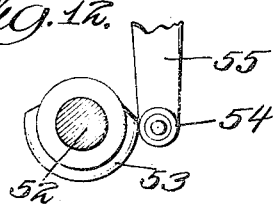
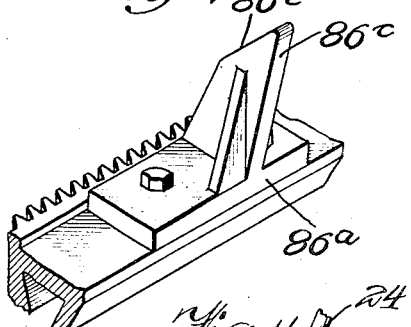
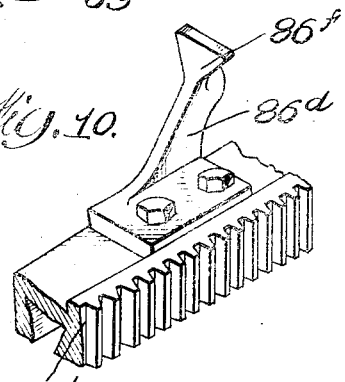
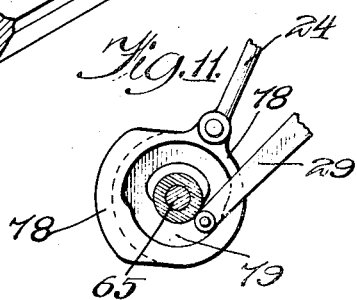

ated cam. Fig. 12, an enlarged detail of
UNITED STATES PATENT OFFICE.

ANTON MILL, OF CINCINNATI, OHIO, ASSIGNOR TO THE PETERS CARTRIDGE COMPANY, OF CINCINNATI, OHIO, A CORPORATION OF OHIO.

TUBE-ROLLING MACHINE.

No. 923,553.    Specification of Letters Patent.    Patented June 1, 1909.

Application filed September 22, 1905. Serial No. 279,658.

*To all whom it may concern:*

Be it known that I, ANTON MILL, a citizen of the United States, residing at Cincinnati, in the county of Hamilton and State of Ohio, have invented certain new and useful Improvements in Tube-Rolling Machines, of which the following is a full, correct, and exact specification.

This invention relates to machines for forming tubes by winding a sheet or strip of any suitable thin material, such for example as paper, upon a mandrel or core, and the invention has for its primary object to provide a machine of this character which will be efficient and rapid in operation.

The invention consists in certain features of novelty in the construction, combination and arrangement of parts hereinafter fully set forth and claimed, and shown in the accompanying drawings illustrating an example of the invention.

Figure 1:
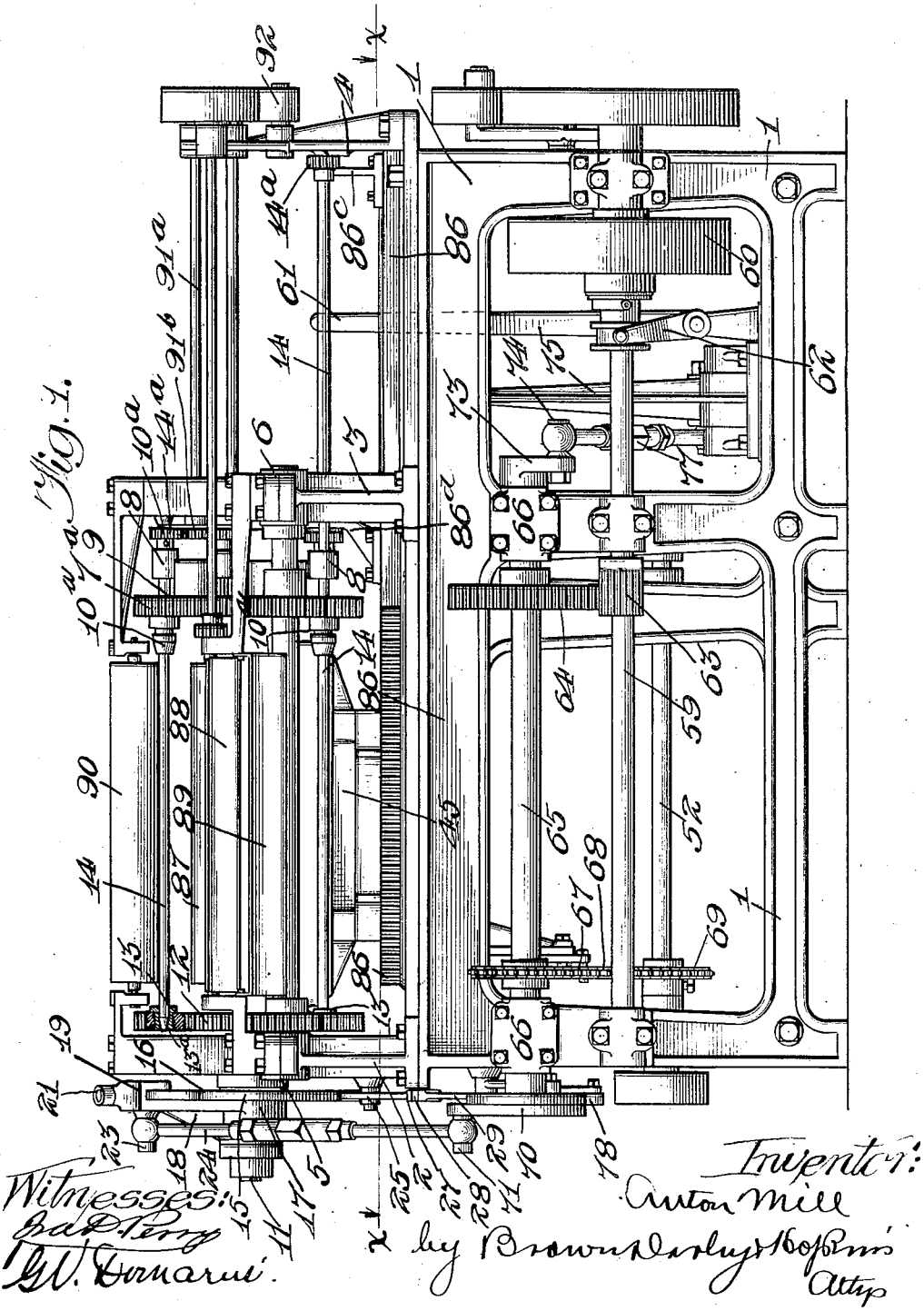
Figure 2:
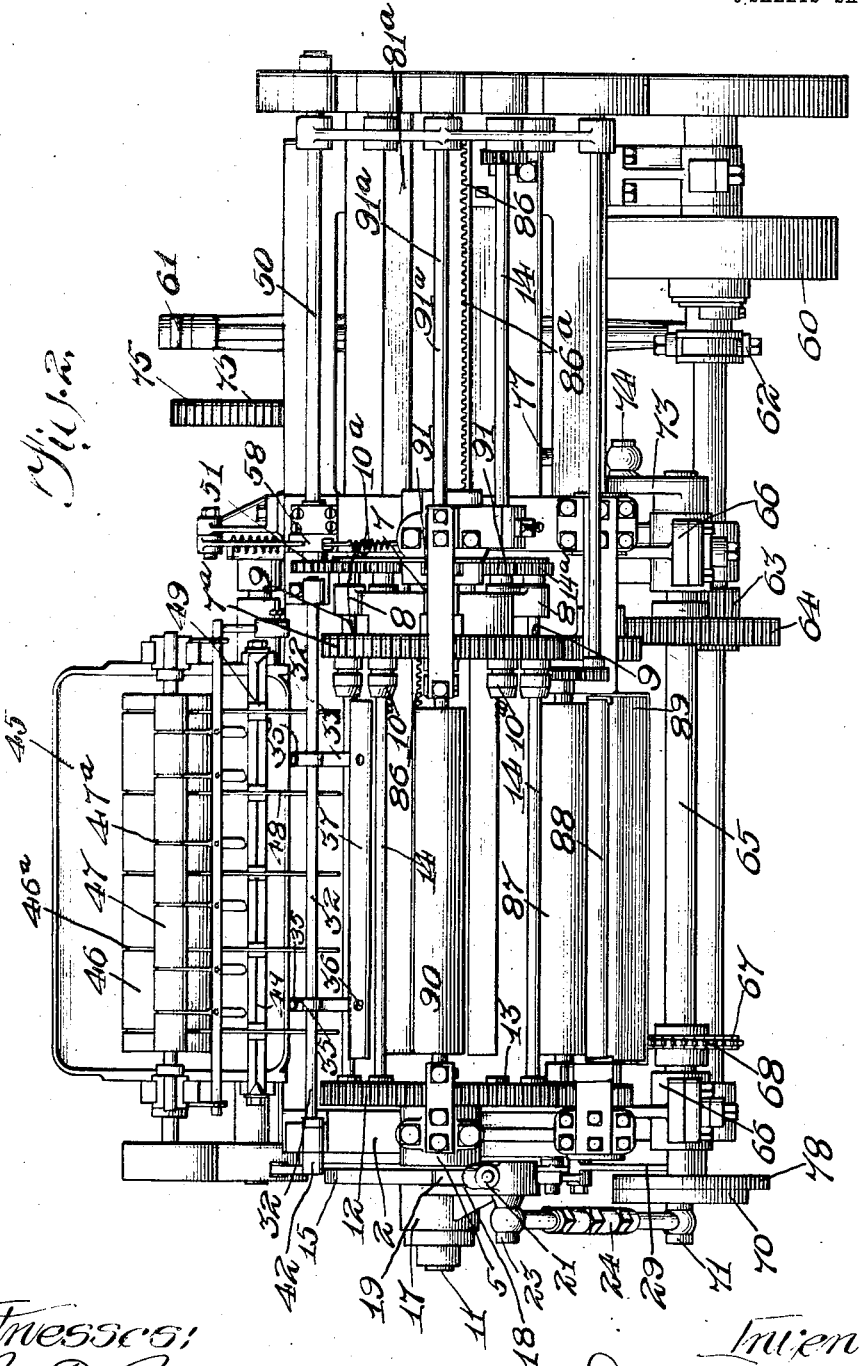
Figure 3:
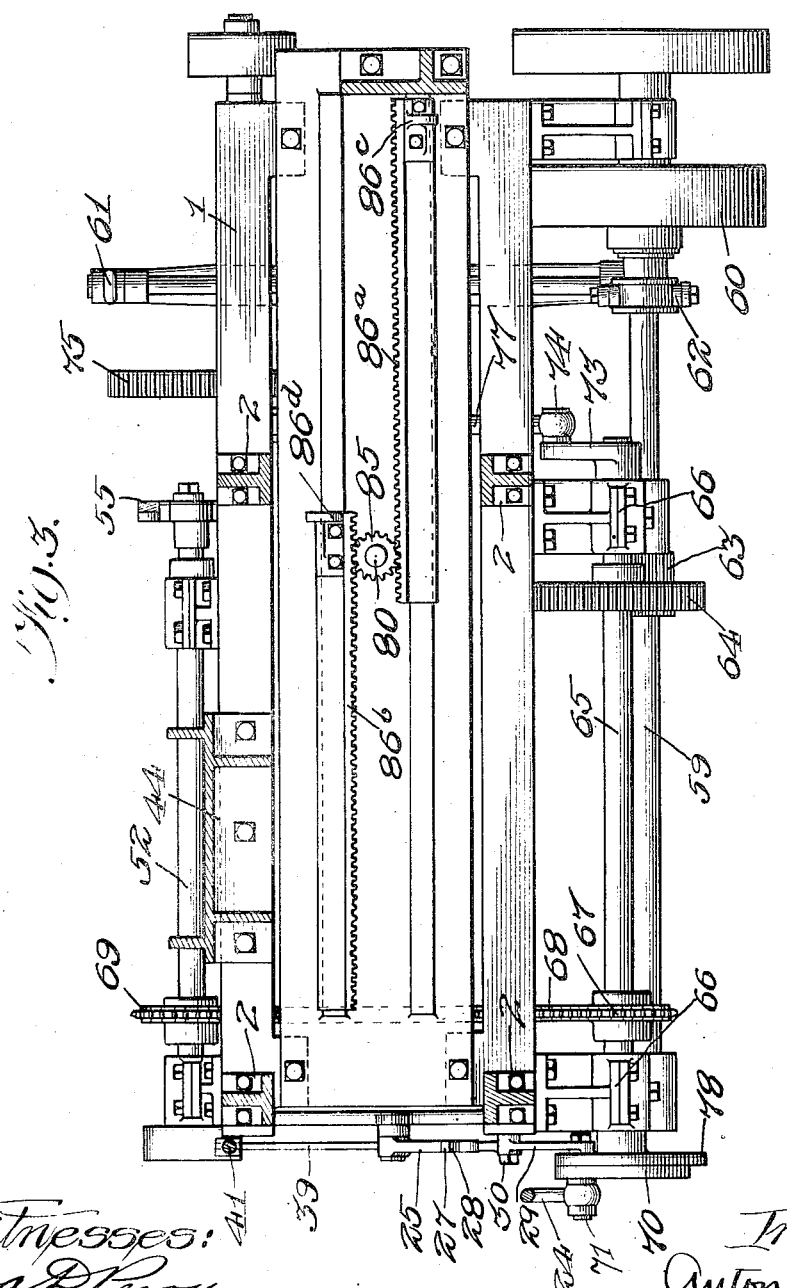
Figure 4:
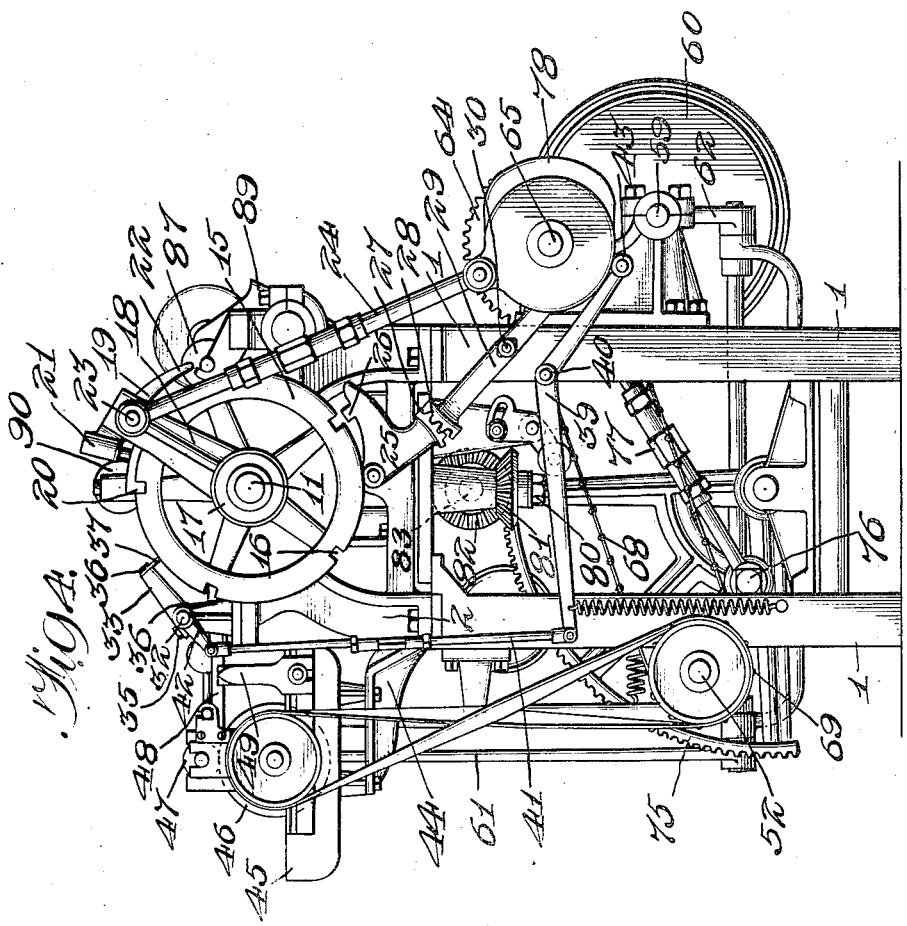
Figure 5:
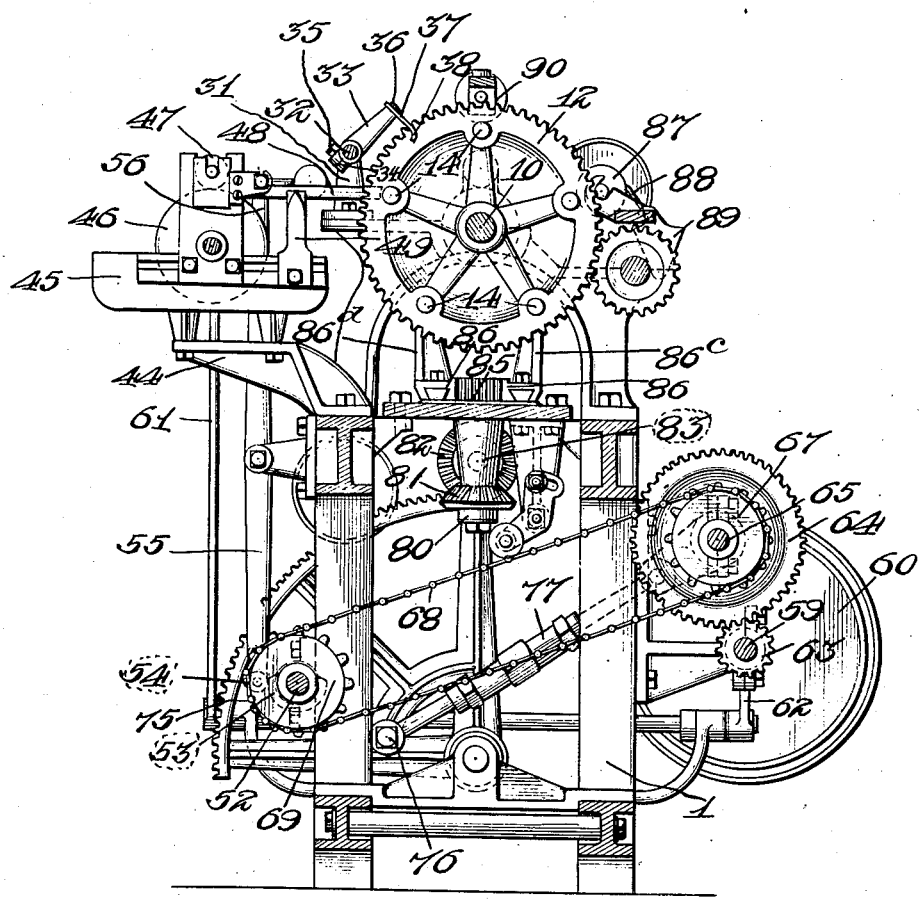
Figure 6:
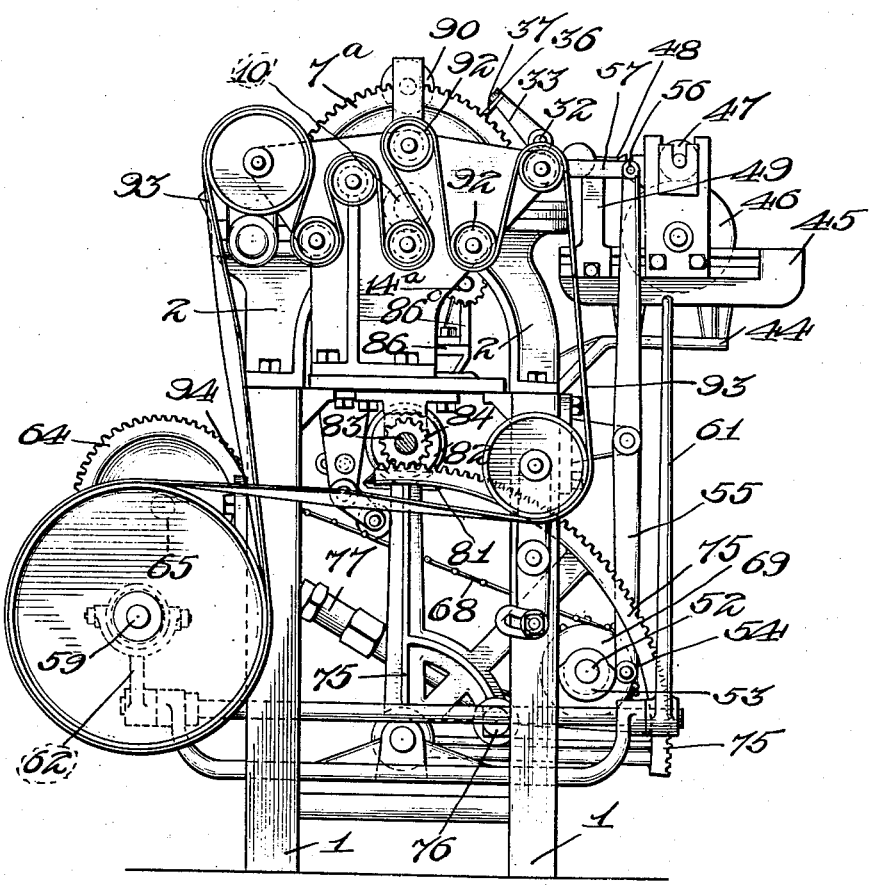

In the said drawings,—Figure 1 is a front elevation of the entire machine. Fig. 2, a top plan view. Fig. 3, a top plan view taken on line $x$—$x$ of Fig. 1, showing the mandrel inserting and ejecting finger operating racks. Fig. 4 is a left hand end elevation of Fig. 1. Fig. 5, a left hand end elevation of Fig. 1, with a portion of the frame and operating mechanism removed. Fig. 6, a right hand end elevation of Fig. 1. Fig. 7, an enlarged detail view partly in section of the mandrel carrying mechanism and its coöperating gears. Fig. 7$^a$, a sectional plan view on line $a$—$a$ of Fig. 7. Fig. 8, an enlarged detail view of the framework and gearing of the mandrel carrying mechanism. Figs. 9 and 10, enlarged detail views of the rack carrying the mandrel ejecting and inserting fingers. Fig. 11, an enlarged detail view of the intermittent feeding pawl operating cam. Fig. 12, an enlarged detail of the cam for contracting the movement of the continuously rotating gear which drives the mandrel. Fig. 13, an enlarged detail of the operating pawl. Fig. 14, a front elevation of the plate for guiding the material around the mandrels, and Fig. 15, a sectional view of the mandrel carrying disk or wheel showing one mandrel in position and another slightly withdrawn.

In this exemplification of the invention,—numeral 1 designates the bed of the machine which may be of any construction suitable to form the proper support for the bearings of the various shafts. Secured to the base are a plurality of standards 2, 3, and 4, and the standards 2 and 3 are each provided with bearings 5 and 6. Secured in the bearing 6 of the standard 3 is a sleeve 7 around which a disk or wheel 7$^a$ loosely revolves. Said wheel is provided with a toothed periphery and a plurality of bearings 8 adapted to receive mandrel bearings 9. These bearings are each provided with split ends 10 and a nut or cap 10$^a$ is adapted to be screwed onto said end for contracting the same.

Journaled in the bearing 5 is a stub shaft 11 to the inner end of which is secured a second disk or wheel 12 corresponding in size to the wheel 7. This wheel or disk is also provided with a toothed periphery and carries a plurality of sockets or bearings 13, provided with a tapering bore 13$^a$. One of these sockets 13 is adapted to stand directly opposite each of the mandrel bearings, and the said alined sockets and bearings are adapted to receive the mandrels or cores 14 upon which the tubes are to be formed. The frictional engagement caused by the tapered bore of the socket serves to hold the mandrels secure. Each of the mandrels is provided with a gear or pinion wheel 14$^a$ rigidly carried by one end thereof by means of which the mandrel is given a rotary motion, as will be set forth. Both of the disks or wheels 7 and 12 are located on the inside of the standards 2 and 3. Secured to the other end of the stub shaft 11 and outside of the standard 2 is a ratchet disk or wheel 15 which is provided in its periphery with a plurality of notches or sockets 16, preferably five in number or of such a number sufficient to govern the different steps necessary for the formation and completion of the tube.

Journaled loosely upon the projecting end of the stub shaft 11 and preferably outside of the standard 2 is a sleeve or collar 17 which is provided with an arm 18 in the free end of which is pivoted a pawl 19. Said pawl is centrally mounted and is preferably constructed with its rear end depending to form a nose or hook 20 which is adapted to enter the notches or sockets 16 of the wheel or disk 15 for transmitting an intermittent motion to said disk as hereinafter set forth.

Secured to the arm 18 and directly above the rear end of the pawl 19 is a socket or housing 21 which is adapted to receive one end of the usual coiled spring while the other end thereof engages the pawl for normally depressing the hooked end thereof. The forward end 22 of the pawl is slightly tapered and preferably stands a short distance beyond the periphery of the notched disk or wheel 15. The arm 18 has secured near its free end a wrist pin 23 connected to which is one end of an operating rod 24.

Journaled to the framework of the machine adjacent to the disk or wheel 15 and located at a point within the path of operation of the forward end of the operating pawl 19 is a retaining pawl 25. Said pawl is provided with a projection 26 which is also adapted to enter the notches or sockets 16 of the disk or wheel 15. This retaining pawl is provided with a toothed portion 27 which is engaged by the toothed end 28 of an operating rod 29 which is pivoted as at 30 to the framework of the machine.

Secured to the standards 2 and 3 and slightly in advance of the disks or wheels 7 and 12 are supports or standards 31 having in their upper ends journals for the reception of the shaft 32. An oscillating plate or arm 33 is adjustably secured to said shaft by means of its split end 34 held in place by the transverse bolt 35. To the forward end of the arm is removably secured by means of a bolt 36 a plate 37, the free end of which is curved as at 38 for the purpose of engaging the material at the proper time when it is passing into the machine and causing the same to pass around the mandrel. The end of the plate is notched or cut away sufficiently as at 37$^a$, between its ends to accommodate the various thicknesses of the paper used, and which also permits only the ends 37$^b$ of the plate 37 to rest upon the mandrel to hold the material in position without undue pressure.

A lever 39 is pivoted between its ends as at 40 to the frame work 1, and 41 is an adjustable rod which connects one end of said lever to the crank arm 42, secured to the shaft 32. The free end of the lever 39 preferably carries an anti friction wheel 43.

Secured to the framework and preferably in advance of the arm 33 is a bracket 44 adapted to support a glue or paste pot 45 in which is journaled a paste roller 46 which coöperates with an ordinary feed roller 47 adjustably mounted above the same and between which rollers the material passes to be fed to the machine. A plurality of supporting fingers 48, supported by the standards 49, extend from these rollers toward the machine to guide the pasted material to the mandrels. The ends of these fingers are adapted to enter grooves 46$^a$ and 47$^a$ of the rollers 46 and 47 to prevent the same from contacting with the edge of the material as it is fed into the machine.

Mounted on the framework of the machine and in suitable bearings is a shaft 50 which carries a continuously rotating pinion or gear wheel 51 which gear wheel is adapted to be brought into operative engagement with the mandrel gears 14$^a$ on the mandrels 14 as said mandrels are intermittently rotated forward.

Journaled to the framework at any desired position, but preferably near the base thereof, is a shaft 52 which has secured thereto a cam 53 adapted to engage the end 54 of a pivoted lever 55, the free end 56 of which is connected by means of a link 57 to a sliding box or bearing 58 in which is mounted the shaft 50 which carries the continuously rotating pinion or gear wheel 51. A main driving shaft 59 is also journaled in the framework and mounted on the shaft is the usual driving pulley 60 provided with a clutch for starting said shaft and an operating lever 61 provided with a forked arm 62 for operating the clutch.

Secured to the shaft 59 is a pinion 63 which is adapted to engage a gear wheel 64 carried by a shaft 65 mounted in bearings 66, which are secured to the framework of the machine. A sprocket wheel 67 is also secured to the shaft 65 and 68 is a sprocket chain engaging said wheel 67 and also a sprocket wheel 69 carried by the shaft 52.

A crank wheel 70 is carried by the shaft 65 and said crank is provided with a crank pin 71, to which is connected the end of the adjustable rod 24, the other end of which connects with the wrist pin 23, which is carried by the arm 18. A crank arm 73 is carried by the other end of the shaft 65 and said arm is provided with a wrist pin 74.

Journaled in the framework adjacent to the shaft 65 is a toothed segment 75 and 76 is a wrist pin carried by the segment. An adjustable rod 77 connects the wrist pin 74 on the shaft 65 with the pin 76 on the segment 75 for transmitting motion from the shaft 65 to the segment 75. Adjacent to the crank wheel 70 is a cam wheel 78 provided with a cam groove 79 adapted to receive a frictional pulley carried by the end of the lever 29 which operates the retaining pawl 25, while its periphery engages the pulley 43 on the end of the lever 39 for operating the arm 33.

Journaled in the framework, and located preferably beneath the disk wheel 7$^a$, is a vertical shaft 80, which is provided on its lower end with a gear wheel 81, and said gear is adapted to engage a gear 82 carried by a shaft 83. A pinion wheel 84 also carried by the shaft 83 is adapted to be engaged by the tooth segment 75, from which motion is transmitted to the said shaft 83.

A pinion wheel 85 is carried by the upper end of the shaft 80. Mounted in suitable guides or ways 81$^a$ and held from displacement are racks 86ª and 86ᵇ, which stand on either side of the pinion 85 and are adapted to be engaged and moved forward and back by said pinion 85, when motion is transmitted to the shaft 80 through the medium of the segment 75 and coöperating gear wheels. The rack 86ª is provided with an upwardly extending finger 86ᶜ, the upper edge 86ᵉ of which is inclined or beveled as shown, for the purpose of permitting the advancing mandrel 14 to pass into proper position so that the end of said finger will engage the inner face of the gear 14ª carried by the mandrels and extract the same by lateral movement of the finger 86ᶜ when motion is transmitted to the rack 86ª. An upwardly extending finger 86ᵈ is also carried by the rack 86ᵇ, the extremity of which is flattened or broadened as at 86ᶠ, and is adapted to introduce the mandrels 14 by engaging the outer face of the gear wheel 14ª, which is carried in front of the flattened end, at the next step of movement of the mandrels, and shoves the mandrel longitudinally into position to receive the material at the next step of the machine. It will be seen that during the entire movement of the segment 75, each of the racks carrying their respective fingers will cause the same to make a complete forward and backward movement thereby insuring the proper position of the respective fingers, the beveled edge 86ᵉ of the finger 86ᶜ allowing the advancing mandrel to readily pass the same.

Journaled to the rear of the disks 7ª and 12 is a roller 87 which is adapted to contact with the completed tube and remove therefrom any superfluous paste or glue and 88 is a scraper blade resting upon the periphery of the roller 87 for scraping the paste from said roller and from there it is allowed to pass into the receptacle 89 arranged adjacent to the plate for that purpose. The necessary pressure roller 90 is carried by the framework and engages the tube at the proper time and holds it for a short interval.

A plurality of gear wheels 91, secured to the shafts 91ª, are arranged in the path of the gears 14ª, carried by the mandrels 14, and are mounted in suitable bearings 91ᵇ. On the free end of these shafts are arranged pulleys 92 around which passes a belt 93, preferably crossed at the point 94. This belt drives the shafts 91ª, with which the gears or pinions 14ª on the mandrel 14 engage, causing the latter to rotate as they are brought into contact to complete the formation of the tubes, as will be seen.

The operation of this machine is as follows,—The material may be fed into this machine in any desired manner, either in predetermined lengths or a cutter may be arranged to cut the desired lengths before passing through the paste roller. From there it is advanced toward the machine where it is met by a mandrel just advanced, the material passing slightly over the top of the mandrel. As the mandrel still further advances the forward end of the arm 33 carrying the curved plate 37 is brought down through the medium of the rod 41 lever 39 and cam wheel 78. The curved portion 38 of the plate 37 engages the end of the paper and forces the same slightly around the mandrel to which it adheres. At the same time the arm 33 is brought down a continuously operated gear or pinion wheel 51 is advanced by means of the cam 53 operating upon the end of the lever 55 which is connected to the journal in which the continuously operated gear 51 is mounted by means of the link 57, until said pinion engages one of the pinions 14ª, mounted on the inserted mandrel 14, carried in the mandrel bearings 9. During this operation and while the mandrel is turning the cam wheel 70 causes the rod 24 to operate the pivoted arm 18 which carries the pawl 19. The depending end 20 of said pawl having engaged one of the notches 16 of the disk or wheel 15 will cause the said wheel to be rotated and at the same time carry with it the now partially formed tube on the first mandrel. The pawl 19 will continue in its movement until the end thereof contacts with the end of the retaining pawl 25. The operation of the pawl is so regulated that during its movement the disks or wheels carrying the mandrels will advance just one notch before the retaining pawl 25, through the medium of the lever 29, segments 27 and 28, and operating cam 78, begins to enter one of the notches 16. At this time the end 22 of the pawl 19 engages the end of the pawl 25 and the former is released, the shaft 65 causing the crank wheel 70 to complete its revolution, which will carry the arm 18 backward until the end 20 of the pawl 19 engages another notch to advance the machine one step farther. The tube thus partially formed will be brought by this movement under the pressure roller 90 where it is held for a short period or during the time which the pawl is returning to engage another notch. This operation being repeated the mandrel will carry the tube still farther and bring it into contact with the roller 87 which wipes off all superfluous paste. The mandrels during this portion of the movement of the machine are rotated by means of the gears 14ª coming in contact with the rotating gears 91 which are located within the path of their movement. The paste removing roller 87 being rotated in an opposite direction to the mandrels or tubes with which they contact so as to remove the paste, motion being transmitted to the roller 87 by means of the belt 93 and pulleys 92. It will thus be seen that the formation of the tube is completed in the first three movements of the machine. The machine is then advanced to the fourth position in which the tube is extracted in the following manner,—Motion being transmitted by means of the segment 75 to the pinion 85 which engages the racks 86$^a$—86$^b$, on which are mounted the fingers or projections 86$^c$ and 86$^d$, will move them backward and forward in opposite directions to each other. The mandrel 14 is now brought into such a position that the finger 86$^c$ stands adjacent to the inner face of the gear or pinion 14$^a$ and when motion is transmitted to the rack the finger 86$^c$ will engage the pinion 14$^a$ and draw the mandrels 14 out of the completed tube. The end of the tube will abut against the end of the bearing 9 and collar 10$^a$, which will strip the tube from its mandrel. The mandrel now remains in its extracted position and will pass to the fifth position or to such a position that the outer face of the gear 14$^a$ will stand opposite the end of the finger or projection 86$^d$. The beveled end 86$^e$ of the finger 86$^c$ as will be seen will allow the extracted mandrel to readily pass away from said finger. The fingers 86$^c$ and 86$^d$ are now caused to complete the other half of their motion by the return movement of the segment 75 which as will be seen will insert the ejected mandrel and withdraw another mandrel which has now come into the proper position to be withdrawn.

Motion is transmitted to the machine by means of the driving pulley 60 which is controlled by the ordinary securing and releasing clutch operated by the handle or lever 61. The main driving shaft 59 transmits motion to the shaft 65 by means of the pinion gears 63 and 64 and the sprocket 67 through the chain 68 rotates the sprocket 69 on the shaft 52 setting in motion the cam and crank wheels 78 and 70 which control and operate the feeding and advancing pawl mechanism as set forth. The belt 93 which operates the mandrel rotating gears is given motion by means of a pulley secured to the main driving shaft 59.

Having thus fully described my invention, I desire it understood that I do not wish to limit myself to the exact proportions, location, arrangement, or operation of the several parts of this machine, as various changes may be made without departing from the spirit or the purpose of the invention.

Having thus described my invention, what I claim as new therein, and desire to secure by Letters Patent, is,—

1. A tube forming machine comprising mechanism for carrying a plurality of mandrels, means for intermittently advancing the same, and common means for intermittently rotating said mandrels during the interval of rest of said intermittent advancement.

2. A tube forming machine comprising mechanism for carrying a plurality of mandrels, means for causing an intermittent rotation thereof and means for imparting a successive independent rotation to each of the mandrels during the intervals of rest.

3. A tube forming machine comprising opposed rotary mandrel carriers, diametrically opposite mandrel chucks and sockets mounted on the carriers respectively, means for transmitting intermittent motion to the carriers and means for independently and successively rotating each of the mandrels.

4. A tube forming machine comprising rotating and intermittently advancing mandrels, means for feeding the material to the mandrels, a pivoted arm mounted adjacent to the feeding mechanism, a removable plate carried by the arm and adapted to pass partially around the mandrel to guide the material therearound and positive means for operating said arm to cause the plate to engage the material.

5. A tube forming machine comprising mandrel carrying mechanism, means for rotating the mandrels, a shaft journaled adjacent to the feeding mechanism, an arm secured to the shaft, means for operating the shaft, and a plate carried by the end of the arm, said plate being provided with a curved notched portion at its edge adjacent to the mandrel, for contacting with and guiding the material around the mandrel.

6. A tube forming machine comprising an intermittently operated mandrel carrying mechanism, means for feeding material to the mandrel, means for guiding the material around the mandrel, a journal adjacent to the guiding mechanism, a continuously operated gear mounted on said journal, and means for advancing the said gear to successively engage the mandrels as they are advanced.

7. A tube forming machine comprising an intermittently operated mandrel carrying mechanism, means for feeding material to the mandrel and means for guiding the material around the mandrel, a journal adjacent to the guiding mechanism, a continuously operated gear mounted on said journal, and means for simultaneously operating the guiding mechanism and advancing the rotating gear to engage the mandrels as they are advanced.

8. A tube forming machine comprising a plurality of mandrel carriers, chucks carried by one of said carriers and diametrically opposite sockets supported by the other carrier, a ratchet secured to one of the carriers, said ratchet being provided with a notched periphery, an operating spring controlled pawl resting upon the periphery of the ratchet and adapted to engage the notches, a positively operated retaining pawl also adapted to engage the notches and means for transmitting motion to the operating pawl for intermittently advancing the carriers.

9. A tube forming machine comprising mandrel carriers, a ratchet secured to one of said carriers, a spring controlled pawl mounted adjacent to the periphery of the ratchet, a projection carried by one end of the pawl and adapted to engage the notches, the other end being free, a positively operated retaining pawl adapted to engage the notches and mounted within the path of movement of the operating pawl and means for advancing the operating pawl to cause its free end to engage the retaining pawl for releasing its forward end and returning the said pawl to its normal position.

10. A tube forming machine comprising mandrel carriers, a ratchet secured to one of said carriers, an arm mounted adjacent to the ratchet, a spring pressed pawl carried by the arm, a projection on said pawl adapted to engage the ratchets, the forward end of said pawl being slightly projected, a positively operated retaining pawl adapted to engage the ratchet and means for operating said retaining pawl, a rod connected to the arm and means for moving said rod to cause the operating pawl to contact with the retaining pawl and be released thereby.

11. A tube forming machine comprising mandrel carrying mechanism, material guiding mechanism, intermittent feeding mechanism for the mandrel carrying mechanism, a retaining pawl, operating levers connected to the guiding and feeding mechanism, and retaining pawl, a driven shaft and cams carried by the shaft, said cams being adapted to engage the levers to transmit motion to the several parts.

12. A tube forming machine comprising a mandrel carrying mechanism, material guiding mechanism, intermittent feeding mechanism for the mandrels, a retaining pawl, and operating levers connected to the guiding and feeding mechanism, and retaining pawl, a driven shaft, cams carried by the shaft and adapted to operate the levers for transmitting motion to the several parts, a driving shaft, means for controlling the motion of the driving shaft and means for transmitting motion from the driving to the driven shaft.

13. A tube forming machine comprising a mandrel carrying mechanism, means for causing an intermittent rotation thereof, means for intermittently rotating the mandrels, separate means for withdrawing a mandrel, and means for reinserting said mandrel.

14. A tube forming machine comprising mandrel carrying mechanism, means for intermittently rotating the mandrels, means for extracting a mandrel, means for advancing the extracted mandrel and separate means for reinserting said mandrel.

15. A tube forming machine comprising mandrel carrying mechanism, means for withdrawing the mandrel, means for advancing the mandrel, and separate means for reinserting the mandrel.

16. A tube forming machine comprising mandrel carrying mechanism, and separate means for simultaneously withdrawing one mandrel and inserting another mandrel.

17. A tube forming machine comprising a mandrel carrier, and simultaneously and oppositely moving separate withdrawing and inserting members engaging separate mandrels.

18. A tube forming machine comprising a mandrel carrier and oppositely moving separate mandrel withdrawing and inserting members, and means for simultaneously operating the members.

19. A tube forming machine comprising a mandrel carrier, means for withdrawing and separate means for inserting the mandrels, said means comprising oppositely moving fingers, adapted to engage the mandrels.

20. A tube forming machine comprising a mandrel carrier, means for withdrawing and separate means for inserting a mandrel, said means comprising oppositely moving racks, and fingers carried by the racks adapted to engage and shift the mandrels.

21. A tube forming machine comprising a mandrel carrier, a finger adapted to engage a mandrel for withdrawing the same, means for advancing the mandrel, a second finger adapted to engage the withdrawn mandrel and means for moving the fingers.

22. A tube forming machine comprising a mandrel holder, means for withdrawing and separate means for inserting the mandrels, said means comprising racks, mandrel engaging fingers carried thereby and means for simultaneously moving the racks in opposite directions.

23. A machine of the class described comprising tube forming mechanism, a driven shaft, and means for transmitting motion from the shaft to the operating mechanism, oppositely moving racks mounted adjacent to the forming mechanism, fingers carried by the racks, a pinion engaging the racks, means for operating the pinion, and a connection between the driven shaft and the pinion operating mechanism for causing the movement of the fingers to eject and insert a mandrel.

24. A machine of the class described comprising intermittently operated tube forming mechanism, racks mounted adjacent to the forming mechanism and adapted to move in axial relation to said mechanism, fingers carried by the racks, a shaft, a pinion carried by the shaft and engaging the racks, a gear wheel mounted on the shaft, operating mechanism for driving the gear to move the racks and means for controlling the motion of the operating mechanism.

25. A machine of the class described comprising tube forming mechanism, means for transmitting intermittent motion thereto, racks mounted adjacent to the forming mechanism, fingers carried by the racks, a shaft, a pinion carried by the shaft, and engaging the racks, and means for transmitting motion to the pinion for moving the racks to cause the fingers to simultaneously eject and insert a mandrel.

26. A machine of the class described comprising intermittently operated tube forming mechanism, sliding racks, ejecting and inserting fingers carried by the racks, a shaft, a pinion and a gear wheel carried by the shaft, a supplemental shaft journaled adjacent to the pinion shaft, a gear carried thereby and engaging the pinion shaft gear, a pinion carried by the supplemental shaft, a toothed segment engaging the pinion on the supplemental shaft, and means for operating the segment to cause the movements of the racks.

27. A machine of the class described comprising intermittently operated tube forming mechanism, racks mounted adjacent to the forming mechanism, ejecting and inserting fingers carried by the racks, a shaft, a pinion carried thereby and engaging the racks, a gear carried by the shaft, a supplemental shaft, a gear carried thereby and meshing with the pinion shaft gear, a pinion carried by the supplemental shaft, a segment engaging the pinion, a driven shaft, and an adjustable rod connecting the driven shaft with the segment for operating the latter to transmit motion to the racks.

28. A tube forming machine comprising in combination a plurality of rotary and longitudinally movable mandrels, mandrel carrying means therefor, means for imparting intermittent motion to said carrying means, and separate means operatively connected with the said carrying means for simultaneously withdrawing and introducing the mandrels longitudinally.

29. A tube forming machine including opposed rotary mandrel carriers, diametrically opposite mandrel chucks and sockets mounted on the carriers respectively, mandrels supported thereby, means for transmitting intermittent motion to the carriers and means adapted to engage and independently rotate each of the mandrels.

30. A tube forming machine, including mandrel carrying means, mandrels mounted therein, a gear on each of said mandrels, means for intermittently advancing the mandrels and a series of gears adapted to be successively engaged by the gear on each of the mandrels for intermittently rotating the mandrels during the interval of rest.

31. A tube forming machine comprising rotating and intermittently advancing mandrels, means for feeding the material to the mandrels, a pivoted arm mounted adjacent to the feeding mechanism, a member carried by the arm and adapted to engage and pass partially around the mandrel to guide the material therearound, and a common means for operating the arm to cause the plate to be moved into and out of engagement with the material.

32. A tube forming machine comprising mechanism for carrying a plurality of mandrels, means for causing intermittent rotation of said mechanism, and common means for imparting a successive rotation to each of the mandrels during only the interval of rest.

In testimony whereof I have signed my name to this specification, in the presence of two subscribing witnesses, on this 19th day of September, A. D. 1905.

ANTON MILL.

Witnesses:
ALFRED HERHOLZ,
PHILIP RENNER.